(12) United States Patent
Zhao et al.

(10) Patent No.: US 7,840,135 B2
(45) Date of Patent: Nov. 23, 2010

(54) METHOD, SYSTEM AND APPARATUS FOR DETECTING FAILURE OF AN OPTICAL NETWORK TERMINAL OF A PASSIVE OPTICAL NETWORK

(75) Inventors: Jun Zhao, Shenzhen (CN); Wei Huang, Shenzhen (CN); Yuntao Wang, Shenzhen (CN); Huafeng Lin, Shenzhen (CN); Guo Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 636 days.

(21) Appl. No.: 11/779,148

(22) Filed: Jul. 17, 2007

(65) Prior Publication Data

US 2008/0019690 A1 Jan. 24, 2008

(30) Foreign Application Priority Data

Jul. 18, 2006 (CN) .................. 2006 1 0061740

(51) Int. Cl.
*H04B 10/08* (2006.01)
*H04J 14/00* (2006.01)

(52) U.S. Cl. .................. 398/33; 398/25; 398/17; 398/67; 398/72

(58) Field of Classification Search .................. 398/17, 398/25, 33, 66–72
See application file for complete search history.

(56) References Cited

U.S. PATENT DOCUMENTS 5,452,115 A 9/1995 Tomioka
6,108,112 A * 8/2000 Touma .................. 398/10
6,747,990 B1 * 6/2004 Umayabashi et al. ....... 370/468
7,245,628 B2 * 7/2007 Shi et al. .................. 370/437
7,283,748 B2 10/2007 Jung et al.
7,653,042 B2 * 1/2010 Saniee et al. .................. 370/348
2003/0137975 A1 * 7/2003 Song et al. .................. 370/353
2004/0028405 A1 * 2/2004 Unitt et al. .................. 398/32
2004/0246989 A1 * 12/2004 Brolin .................. 370/466
2005/0163149 A1 * 7/2005 Unitt et al. .................. 370/442
2006/0093356 A1 * 5/2006 Vereen et al. .................. 398/33

FOREIGN PATENT DOCUMENTS

| CN | 1866791 A | 11/2006 |
|---|---|---|
| EP | 1 496 634 A2 | 1/2005 |
| JP | 11-261639 A | 9/1999 |
| JP | 2004-112746 A | 4/2004 |

* cited by examiner

*Primary Examiner*—Dalzid Singh
(74) *Attorney, Agent, or Firm*—Leydig, Voit & Mayer, Ltd.

(57) ABSTRACT

A method for detecting a failure network terminal in a Passive Optical Network includes: changing timeslots assigned to potential failure network terminals one by one; and determining the failure network terminal according to uplink data frames sent by the potential failure network terminals whose timeslots are changed. Embodiments of the present invention also disclose an apparatus and system for detecting a failure network terminal. The solution of the present invention may detect which Optical Network Unit/Terminal (ONU/ONT) fails and perform the corresponding processing in accordance with embodiments of the present invention, which recovers the system health and improves the network security, stability and self-healing ability.

11 Claims, 3 Drawing Sheets

METHOD, SYSTEM AND APPARATUS FOR DETECTING FAILURE OF AN OPTICAL NETWORK TERMINAL OF A PASSIVE OPTICAL NETWORK

This application claims priority to Chinese Patent Application No. 200610061740.1, filed Jul. 18, 2006, which is hereby incorporated by reference.

FIELD OF THE INVENTION

The present invention relates generally to a Passive Optical Network (PON), and more particularly, to a method, system and apparatus for detecting a failure network terminal of a PON.

BACKGROUND OF THE INVENTION

In comparison with cable transmission, optical transmission has such advantages as greater capacity, less loss and greater power for avoiding electromagnetic interference. Therefore, along with the gradual descent of optical transmission cost, the optical access network has become the inevitable developing trend. The Passive Optical Network (PON), which uses passive devices, is a most promising technology for implementing a wideband optical access network.

The PON technology is classified by the bearer content as ATM Based PON (APON), Ethernet Based PON (EPON), Gigabit PON (GPON), etc.

Referring to FIG. 1, a PON is usually composed of an Optical Line Terminal (OLT) residing in the Center Office (CO) and a plurality of Optical Network Units (ONUs) or Optical Network Terminals (ONTs) residing in the customer premise. An Optical Distribution Network (ODN) consisting of optical fiber, passive optical splitter or coupler is used to connect such devices of CO to the devices of the customer premise.

Referring to FIG. 2, the transfer of downlink data from the PON network to the customer premise is different from that of uplink data from the customer premise to the PON network. The downlink data is broadcasted from the OLT to each ONU. Each ONU matches destination address carried in protocol transmission unit header of the data received with the address of the ONU, and processes the data if the destination address carried in the data matches the ONU's address.

Due to media sharing characteristic of ODN, the uplink data transmission is relatively complex. To avoid collision, the uplink data is transmitted using Time Division Multiple Address (TDMA) mode, and the uplink data transmission are controlled by the OLT according to control mechanism of the OLT.

In a point-to-multipoint passive optical network system, the uplink data is transmitted using the TDMA mode. Each ONU or ONT sends data to the OLT in the TDMA mode. In normal conditions, the OLT assigns timeslot for each ONU (i.e. authorizes each ONU) to guarantee only one ONU lights at one period of time. The ONU opens a light module only within the timeslot (authorization) assigned by the OLT, which makes no collision.

However, in the case of the above method, if an ONU fails and sends uplink data at a period time rather than the timeslot assigned by the OLT, the uplink data sent by this ONU will overlap the uplink data of other adjacent ONUs, which makes data errors.

An uplink data frame includes two parts, i.e. frame header and data payload, as shown in FIG. 3. The frame header and the data payload can be distinguished by a frame delimiter therebetween. The frame header is mainly used for frame synchronization. In TDMA uplink communications, an OLT takes frame delimiter detected time as the frame reaching time of the uplink data frame.

When an ONU in an optical network fails, e.g. ONU1 in FIG. 4 fails, ONU1 may transmit an uplink non-framing signal, e.g. signal not in frame or meaningless signal, earlier or later, and this non-framing signal may overlap the uplink data frame of ONU2. Since the signal sent by ONU1 is a non-framing signal, the OLT is unable to detect the coming of the non-framing signal from ONU1 and regards that the uplink data frame from ONU1 is lost. Furthermore, since the non-framing signal of ONU1 overlaps part of the frame of ONU2, the OLT may be unable to detect the frame delimiter and can not identify where the frame header of ONU2 is located. Thus the LT may regard that the data frame from ONU2 is also lost.

When the above case occurs, since the OLT regards that data frames from both ONU1 and ONU2 are lost, it is difficult to determine which ONU fails.

SUMMARY OF THE INVENTION

Embodiments of the present invention provide a method, system and apparatus for detecting a failure optical network terminal in a PON, to rapidly detect a failure optical network terminal when uplink data error occurs.

A method for detecting a failure network terminal in a Passive Optical Network, may include:

changing timeslots assigned to potential failure network terminals one by one;

determining the failure network terminal according to uplink data frames sent by the potential failure network terminals whose timeslots are changed.

An apparatus for detecting a failure network terminal of in a Passive Optical Network, includes:

a first unit, configured to change timeslots assigned to potential failure network terminals one by one;

a second unit, configured to determine the failure network terminal according to uplink data frames sent by the potential failure network terminals whose timeslots are changed.

A system for detecting a failure network terminal in a Passive Optical Network, includes:

a failure network terminal detecting device, configured to change timeslots assigned to potential failure network terminals one by one, and determine a failure network terminal according to the uplink data frames sent by the potential failure network terminals whose timeslots are changed.

Embodiments of the present invention regard a failure network terminal and network terminals assigned with timeslots prior to and later than the timeslot assigned to the failure network terminal as potential failure network terminals, change the timeslots assigned to the potential failure network terminals, and determine the failure network terminal according to the uplink data frames sent by the potential failure network terminals in an uplink communication after the timeslots have been changed, to close or maintenance the failure network terminal, thereby improving the network security, stability and self-healing ability.

BRIEF DESCRIPTION OF THE DRAWINGS

The present invention is hereinafter further described in detail with respect to the accompanying drawings and embodiments. It should be noted that the following description is specific embodiments described in this disclosure and is not for use in limiting the protection scope of the present invention. The accompanying drawings are as follows.

DETAILED DESCRIPTION OF THE INVENTION

According to embodiments of the present invention, when detecting that an uplink data frame sent by a network terminal of a PON is lost, the network terminal and network terminals assigned with timeslots prior to and later than the timeslot assigned to the network terminal may be regarded as a potential failure network terminal group. The timeslots assigned to the network terminals of the potential failure network terminal group are changed. Determine the failure network terminal by determining the uplink data frames received from the network terminals in uplink communications after the timeslots are changed.

Changing the timeslots assigned to the network terminals of the potential failure network terminal group may be adjusting the relative positions of the timeslots of the network terminals in uplink communications. The adjusting the relative positions of the timeslots of the network terminals in uplink communications is actually adjusting assignment of the timeslots of the network terminals in uplink communications. If the timeslot assigned to a network terminal is infinite, the network terminal may stop sending uplink data in this uplink communication. Therefore, the failure network terminal may be found by controlling the network terminals in the potential failure network terminal group to stop sending uplink data one by one.

When the timeslot of one network terminal of the potential failure network terminal group is changed and the timeslots of other network terminals remain unchanged, if the uplink data frames from the other network terminals of the potential failure network terminal group can be detected normally, the network terminal having the changed timeslot is the failure network terminal.

The network terminal in the embodiments of the present invention, for example, is an ONU while the apparatus for detecting a failure ONU of a PON, for example, is an OLT. However, it can be understood by those skilled in the art that the network terminal may be an ONU, ONT or other optical network terminals while the apparatus for detecting a failure ONU of a PON may also be other applicable apparatuses.

In one embodiment of the present invention, taking ONU1 and ONU2 as an example, a failure ONU may be found by adjusting the relative positions of the timeslots assigned to the ONU1 and the ONU2 in the uplink communication.

When the ONU1 fails, the ONU1 may transmit an uplink non-framing signal earlier or later. This non-framing signal overlaps the uplink data frame from ONU2. Thus the OLT is unable to receive the uplink data frames from both ONU1 and ONU2. As a result, the OLT is unable to determine which ONU is failed.

Figure 1:
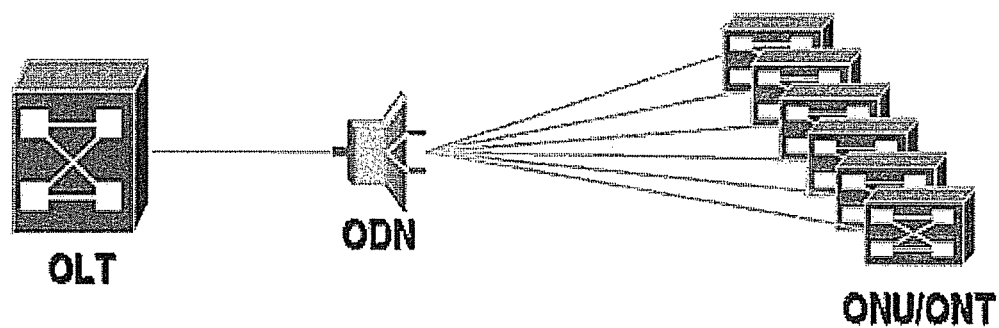
FIG. 1 is a schematic diagram illustrating a PON system in prior art.
Figure 2:
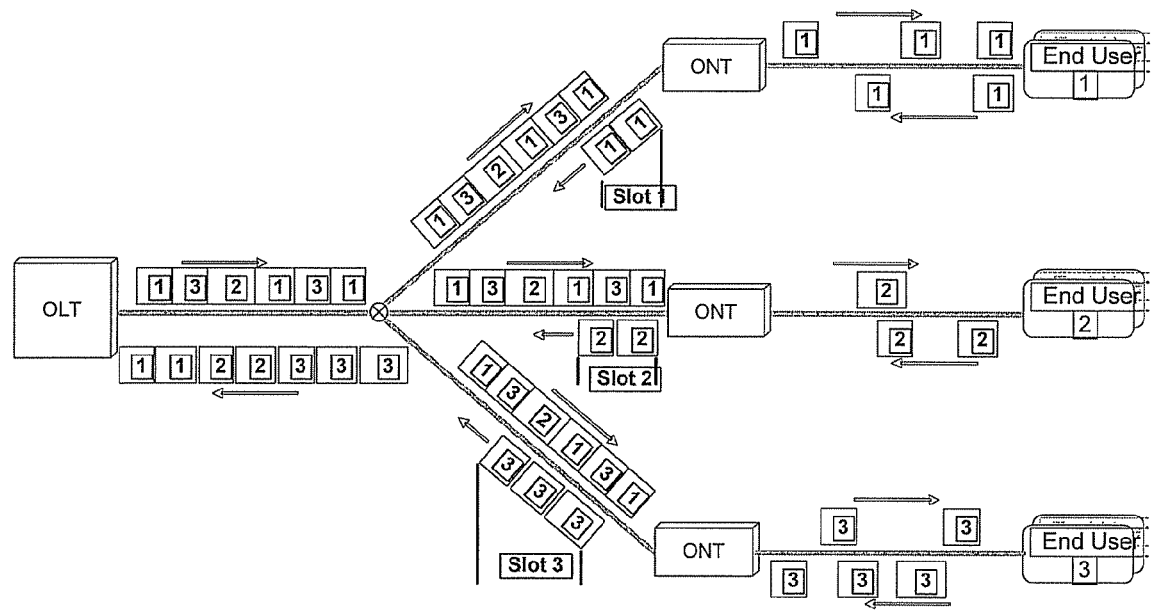
FIG. 2 is a schematic diagram for sending the uplink/downlink data in a PON system in prior art.
Figure 3:
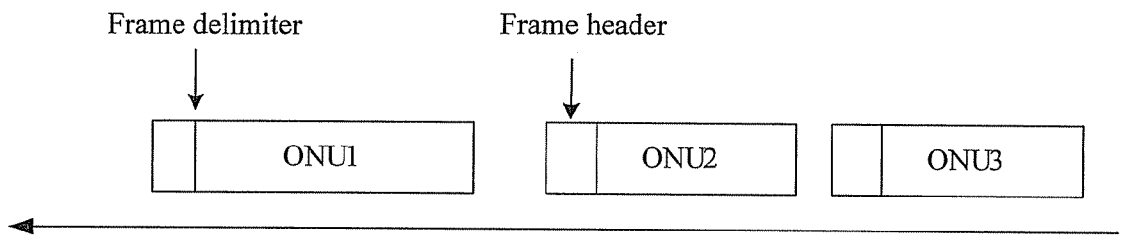
FIG. 3 is a schematic diagram illustrating uplink data frames in a normal uplink communication in prior art.
Figure 4:
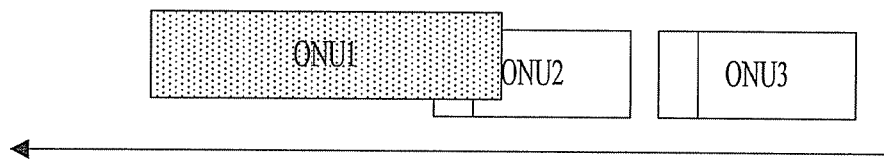
FIG. 4 is a schematic diagram illustrating uplink data frames in a failure uplink communication in prior art.
Figure 5:
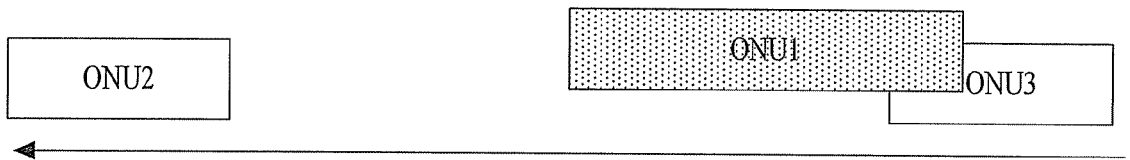
FIG. 5 is a schematic diagram for changing relative positions of timeslots in accordance with an embodiment of the present invention.

To solve the above mentioned problem, in this embodiment, the failure ONU is determined by adjusting the relative positions of timeslots assigned to ONU1 and ONU2 in the uplink communication. Referring to FIG. 5, if the OLT detects that a failure occurs in this uplink communication, the OLT may adjust the relative positions of the timeslots assigned to ONU1 and ONU2 for next uplink communication, to make longer gap between the timeslot of ONU1 and that of ONU2. For example, as shown in FIG. 5, the OLT assigns a longer timeslot to ONU1 to delay the timeslot assigned to ONU1.

Upon the above adjustment, the frame header and the frame delimiter of the uplink data frame from ONU2 may not be overlapped by the signal from ONU1. In this case, if the OLT receives the uplink data frame from ONU2 and is still unable to receive the uplink data frame from ONU1, the OLT may determine that ONU1 is failed while ONU2 is normal. After determining ONU1 is failed, the OLT give an alarm, and sends control signals for closing ONU1.

In an alternative embodiment of the present invention, still taking ONU1 and ONU2 as an example, a failure ONU may be found by controlling ONU1 or ONU2 to stop sending uplink data frames in the uplink communication. Controlling ONU1 or ONU2 to stop sending the uplink data may be regarded as assigning the infinite timeslots to ONU1 or ONU2.

For example, when a failure occurs, ONU1 is controlled to stop sending the uplink data in an uplink communication. If the uplink data sent by ONU2 can be received by the OLT correctly, the ONU1 is the failure ONU. If the uplink data sent by ONU2 can not be received by the OLT, ONU2 may be the failure ONU. In this case, ONU1 may also be a failure ONU. ONU2 is further controlled to stop sending the uplink data. In this situation, if the OLT still can not receive the uplink data sent by ONU1, it can be determined that the ONU1 is failed.

If it is the case that there are multiple failure ONUs in the PON, the failed ONUs can also be determined by the following embodiments of the present invention.

In an alternative embodiment of the present invention, a solution for fast determining the failure ONU is provided.

Figure 6:
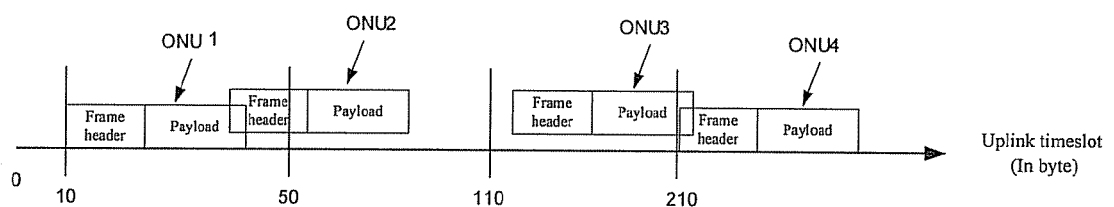
FIG. 6 is a schematic diagram illustrating uplink data frames when multiple ONUs fail simultaneously.

For example, the scenario shown in FIG. 6 occurs.

The uplink data frame from ONU1 overlaps part of the uplink data frame from ONU2, and the uplink data frame from ONU3 overlaps part of the uplink data frame from ONU4. If the above mentioned method of adjusting the relative positions of timeslots is still used to detect the failure ONUs, the timeslot assigned to ONU2 may be adjacent to that of ONU4. As a result, the ONU2 and the ONU4 still behave as failure ONUs, this will cause a misjudgment. In this case, the failure ONU may be found quickly by the following solution.

Figure 7:
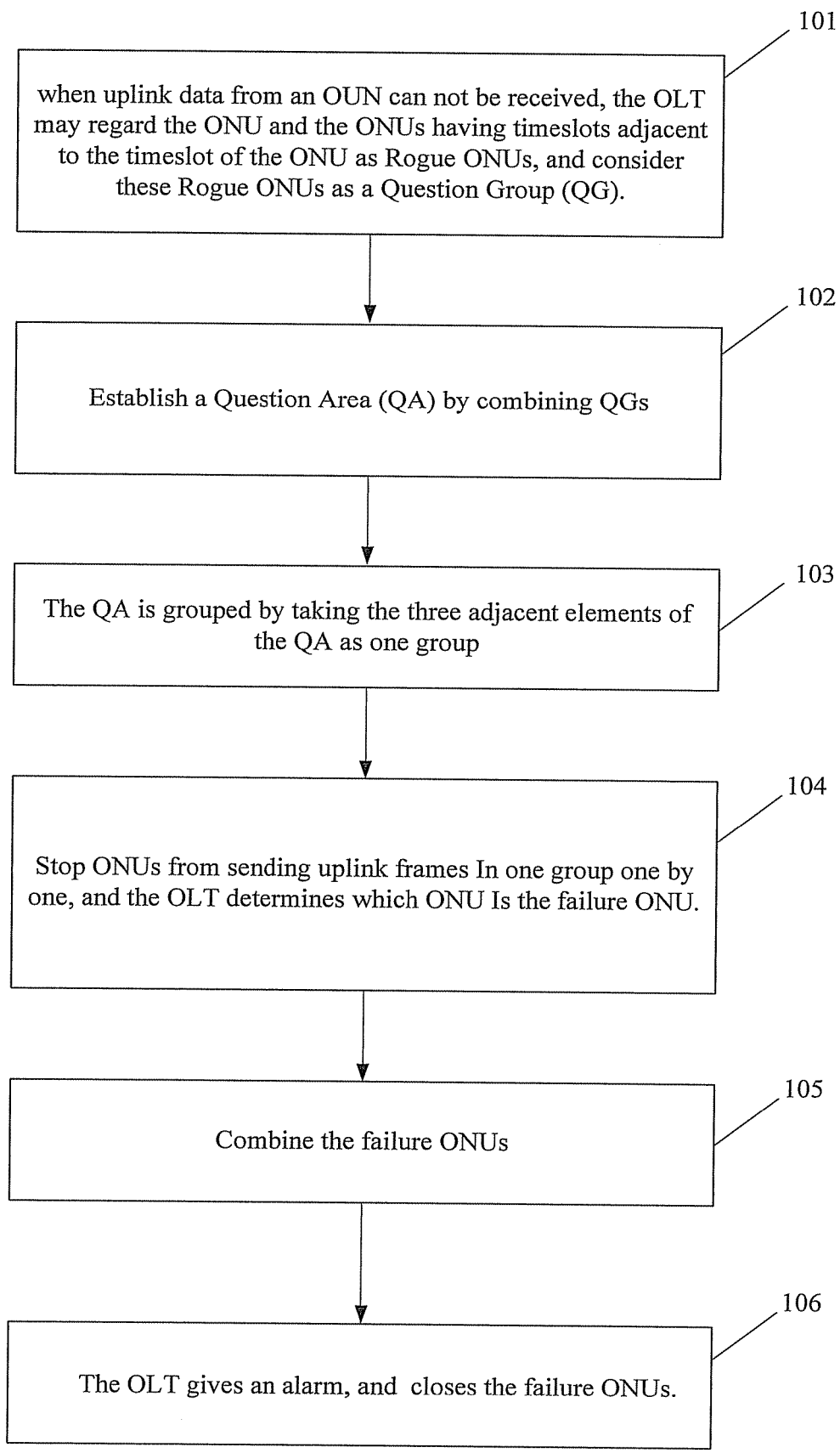
FIG. 7 is a flowchart of an alternative embodiment in accordance with the present invention.

FIG. 7 shows a flowchart of detecting the failure ONUs according to the embodiment of the present invention.

Block 101, Establish a Question Group (QG).

In the Nth uplink communication, when uplink data from some OUNs can not be received, the OLT may regard one of these ONUs, a ONU having the timeslot prior to the timeslot of the ONU, and a ONU having the timeslot later than the timeslot of the ONU, as Rogue ONUs, and consider the three ONUs as a Question Group (QG). For example, if ONUj is the ith ONU that has sent error uplink data, QGi can be used to represent the QG of the ith time, and $QGi=\{ONUj-1, ONUj, ONUj+1\}, 1 \leq i \leq M, 1 \leq M \leq n,$
$1 \leq j \leq n,$ wherein n denotes the total number of the ONUs in the system, M denotes the number of the failure ONUs.

For another example, if the uplink data sent by ONU2 and ONU3 can not be received, QG1=f{ONU1, ONU2, ONU3}, QG2={ONU2, ONU3, ONU4}.

Block 102: Establish a Question Area (QA).

Here, the QA may be defined as follows:

$$QA = \bigcup_{i=1}^{M} QGi,$$

wherein M denotes the number of the failure ONUs.

The QA is obtained by combining the ONUs in the QGs. For example, when the uplink data sent by ONU1 and ONU3 can not be received, the QA may be as follows:

QA={ONU1, ONU2, ONU3, ONU4}.

Block 103: Establish a Search Group (SG)

The QA is grouped by taking three adjacent elements of the QA as one group, to obtain SGs, the number of the SGs may be L, obtained as follows:

$$\left\lceil \frac{\#QA}{3} \right\rceil = L, 1 \leq L \leq n$$

If the elements of the last SG are less than three, the former one or two adjacent ONUs will be added in the last SG. For example, if QA={ONU1, ONU2, ONU3, ONU4}, the SGs are:

SG1{ONU1, ONU2, ONU3}; SG2{ONU2, ONU3, ONU4}.

Block 104: Position the failure ONU in each SG.

For example, for SGk={ONUj−1, ONUj, ONUj+1}, 1≤k≤L, 1≤j≤n, the failure ONU in SGi may be positioned as follows.

The OLT allocates "0" pointer for the timeslot of ONUj−1 in the bandwidth mapping (Bwmap) of the N+1th downlink frame, so that the ONUj−1 does not send uplink data in the N+1th uplink communication.

Observe the uplink frames received in the N+1th uplink communication. If the uplink data sent by ONUj and ONUj+1 are detected correctly, ONUj−1 is the failure ONU, and RESULTk={ONUj−1}.

The OLT allocates "0" pointer for the timeslot of ONUj in the bandwidth mapping (Bwmap) of the N+2th downlink frame, so that ONUj does not send uplink data in the N+2th uplink communication.

Observe the uplink frames received in the N+2th uplink communication. If the uplink data sent by ONUj−1 and ONUj+1 are detected correctly, ONUj is the failure ONU, and RESULTk={ONUj}; otherwise, ONUj+1 is the failure ONU, and RESULTk={ONUj+1}.

The process of positioning the failure ONU in each SG may be preformed synchronously.

Block 105: Determine all the failure ONUs

All the failure ONUs in the system may be determined by:

$$RESULT = \bigcup_{k=1}^{L} RESULTk.$$

The failure ONUs are determined by combining the one or more failure ONUs in each SG.

Block 106: The OLT gives an alarm, and closes the failure ONUs.

In an alternative embodiment of the present invention, an apparatus for detecting failure ONUs is provided.

The apparatus for detecting failure ONUs in this embodiment may include a first unit and a second unit. The first unit may be configured to change the timeslot assigned to a potential failure network terminal, and the second unit may be configured to determine a failure network terminal according to the uplink data frame sent by each network terminal in an uplink communication after the timeslot is changed.

For one aspect of the apparatus, the first unit includes a control unit. The control unit is configured to one by one stop one or more potential failure network terminals from sending uplink data frame. That is, the control unit one by one assigns infinite timeslot to one or more potential failure network terminals in next uplink communication. The apparatus further includes a grouping unit configured to group a network terminal whose uplink data is lost and network terminals having timeslots prior to and later than the timeslot of the network terminal into a potential failure network terminal group. The grouping unit is also configured to divide the potential failure network terminal group into one or more sub-groups. In this case, the control unit is further configured to stop the network terminals in each sub-group from sending uplink data one by one. The second unit includes a failure network terminal determining unit. The failure network terminal determining unit is configured to determine that the network terminal stopping sending uplink data is the failure network terminal, when the uplink data frames from other network terminals can be received correctly. The working process of the first unit and the second unit in this example is similar to the above mentioned embodiment of the present invention, those skilled in the prior art can easily construct the apparatus of this embodiment. Therefore, detailed working processes and implementation procedure of the apparatus for detecting a failure ONU of this embodiment will not be described again, and will not be limited to the apparatus model of this example.

For another aspect of the apparatus, the first unit includes a timeslot changing unit. The timeslot changing unit may be configured to change the timeslot of the network terminal whose uplink data is lost in an uplink communication and the timeslots of network terminals having timeslots prior to and later than the timeslot of the network terminal whose uplink data is lost. In this example, the timeslot assigned to each network terminal is not infinite. The second unit includes a determining unit. The determining unit is configured to determine that the network terminal whose uplink data frame is still lost is the failure network terminal, after the timeslots assigned to the networks are changed. The working process of the first unit and the second unit in this example is similar to the first mentioned embodiment of the present invention, those skilled in the prior art can easily construct the apparatus of this embodiment. Therefore, detailed working processes and implementation procedure of the apparatus for detecting a failure ONU of this embodiment will not be described again, and will not be limited to the apparatus model of this example.

In another embodiment of the present invention, a PON which is able to detect failure network terminal is provided.

The PON of this embodiment can detect a failure network terminal and perform the corresponding processing for the failure network terminal, to recover the system health and improve the network security, stability and self-healing ability.

The PON of this embodiment may include a network terminal and a failure network terminal detecting device.

The failure network terminal detecting device may include a first unit and a second unit.

For one aspect of the failure network terminal detecting device, the first unit includes a control unit. The control unit may be configured to one by one stop one or more potential failure network terminals from sending uplink data frame. That is, the control unit one by one assigns infinite timeslot to one or more potential failure network terminals in the next uplink communication. The apparatus may further include a grouping unit configured to group a network terminal whose uplink data is lost and network terminals having timeslots prior to and later than the timeslot of the network terminal into a potential failure network terminal group. The grouping unit may be configured to divide the potential failure network terminal group as one or more sub-groups. In this case, the control unit may be further configured to stop the network terminals in each sub-group from sending uplink data one by one. The second unit may include a failure network terminal determining unit. The failure network terminal determining unit may be configured to determine that the network terminal stopping sending uplink data is the failure network terminal, when the uplink data frames from other network terminals can be received correctly. The working process of the first unit and the second unit in this example is similar to the above mentioned embodiment of the present invention, those skilled in the prior art can easily construct the apparatus of this embodiment. Therefore, detailed working processes and implementation procedure of the apparatus for detecting a failure ONU of this embodiment will not be described again, and will not be limited to the apparatus model of this example.

For another aspect of the failure network terminal detecting device, the first unit may include a timeslot changing unit. The timeslot changing unit may be configured to change the timeslot of the network terminal whose uplink data is lost in an uplink communication and the timeslots of network terminals having timeslots prior to and later than the timeslot of the network terminal whose uplink data is lost. The second unit may include a determining unit. The determining unit may be configured to determine that the network terminal whose uplink data frame is still lost is the failure network terminal, after the timeslots assigned to the networks are changed. The working process of the first unit and the second unit in this example is similar to the above mentioned embodiment of the present invention, those skilled in the prior art can easily construct the apparatus of this embodiment. Therefore, detailed working processes and implementation procedure of the apparatus for detecting a failure ONU of this embodiment will not be described again, and will not be limited to the apparatus model of this example.

Though the present invention has been illustrated and described by some preferred embodiments, those skilled in the art should understand that various changes may be made in form and detail without departing from the scope of the present invention and therefore should be covered in the protection scope of the present invention assigned by the appended claims and its equivalents.

The invention claimed is:

1. A method for detecting a failed network terminal in a Passive Optical Network, comprising:
   assigning, by an Optical Line Terminal (OLT), a timeslot to potential failed network terminals one by one, to make one of the potential failed network terminals stop sending uplink data at a time;
   changing, by the OLT, timeslots assigned to potential failed network terminals one by one; and
   determining, by the OLT, the failed network terminal according to uplink data frames sent by the potential failed network terminals whose timeslots are changed;
   wherein the potential failed network terminals comprise the failed network terminal and network terminals assigned with timeslots prior to and later than a timeslot assigned to the failed network terminal.

2. The method of claim 1, wherein determining by the OLT a failed network terminal according to uplink data frames sent by the potential failed network terminals whose timeslots are changed comprises:
   determining, by the OLT, that the network terminal assigned a changed timeslot is the failed network terminal, if the uplink data frames sent by other network terminals are able to be received normally.

3. The method of claim 1, further comprising:
   regarding the network terminal whose uplink data frame is unable to be received in the uplink communication and the network terminals having timeslots prior to and later than the timeslot of the network terminal whose the uplink data frame is unable to be received as a potential failed network terminal group;
   dividing, by the OLT, the potential failed network terminal group into one or more sub-groups;
   assigning, by the OLT, an infinite timeslot to one potential failed network terminal in one sub-group one by one.

4. The method of claim 3, wherein dividing by the OLT the potential failed network terminal group into one or more sub-groups comprises:
   grouping, by the OLT, three network terminals of the potential failed network terminal group as one sub-group successively.

5. The method of claim 3, wherein assigning by the OLT the infinite timeslot to one potential failed network terminals in one sub-group one by one comprises:
   allocating, by the OLT, 0 pointer for the timeslots in the bandwidth mapping of downlink frame of the network terminals in the sub-group successively.

6. An apparatus for detecting a failed network terminal in a Passive Optical Network, comprising:
   a control unit, configured to assign a timeslot to one network terminal of the potential failed network terminals one by one, to make one of the potential failed network terminals stop sending uplink data at a time;
   a first unit, configured to change timeslots assigned to potential failed network terminals one by one;
   a second unit, configured to determine the failed network terminal according to uplink data frames sent by the potential failed network terminals whose timeslots are changed;
   wherein the potential failed network terminals comprise the failed network terminal and network terminals assigned with timeslots prior to and later than a timeslot assigned to the failed network terminal.

7. The apparatus of claim 6, wherein the first unit further comprises:
   a grouping unit, configured to regard the network terminal whose uplink data frame is unable to be received in the uplink communication and the network terminals having timeslots prior to and later than the timeslot of the network terminal whose uplink data frame is unable to be received as a potential failed network terminal group; and divide the potential failed network terminal group into one or more sub-groups;

the control unit further comprises one or more units configured to assign an infinite timeslot to one potential failed network terminals in one sub-group one by one.

8. The apparatus of claim 6, wherein the second unit comprises:

a failed network terminal determining unit, configured to determine that the network terminal assigned a changed timeslot is the failed network terminal, if the uplink data frames sent by other network terminals are able to be received normally.

9. A system for detecting a failed network terminal in a Passive Optical Network, comprising:

a control unit, configured to assign a timeslot to the potential failed network terminals one by one, to make one of the potential failed network terminals stop sending uplink data at a time;

a failed network terminal detecting device, configured to change timeslots assigned to potential failed network terminals one by one, and determine a failed network terminal according to the uplink data frames sent by the potential failed network terminals whose timeslots are changed;

wherein the potential failed network terminals comprise the failed network terminal and network terminals assigned with timeslots prior to and later than a timeslot assigned to the failed network terminal.

10. The system of claim 9, wherein the failed network terminal detecting device further comprises:

a grouping unit, configured to regard the network terminal whose uplink data frame is unable to be received in the uplink communication and the network terminals having timeslots prior to and later than the timeslot of the network terminal whose uplink data frame is unable to be received as a potential failed network terminal group; and divide the potential failed network terminal group into one or more sub-groups;

the control unit further comprises one or more units configured to assign an infinite timeslot to one potential failed network terminal in one sub-group one by one.

11. The system of claim 9, wherein the network terminal comprises an optical network unit or an optical network terminal; the failed network terminal detecting device comprises an optical line terminal.

* * * * *